Oct. 3, 1950     H. S. MARTIN     2,524,673
ICE CREAM CONE DISPENSER

Filed April 11, 1949     4 Sheets-Sheet 1

INVENTOR.
HOWARD S. MARTIN
BY
ATTORNEY

Oct. 3, 1950 H. S. MARTIN 2,524,673
ICE CREAM CONE DISPENSER
Filed April 11, 1949 4 Sheets-Sheet 2
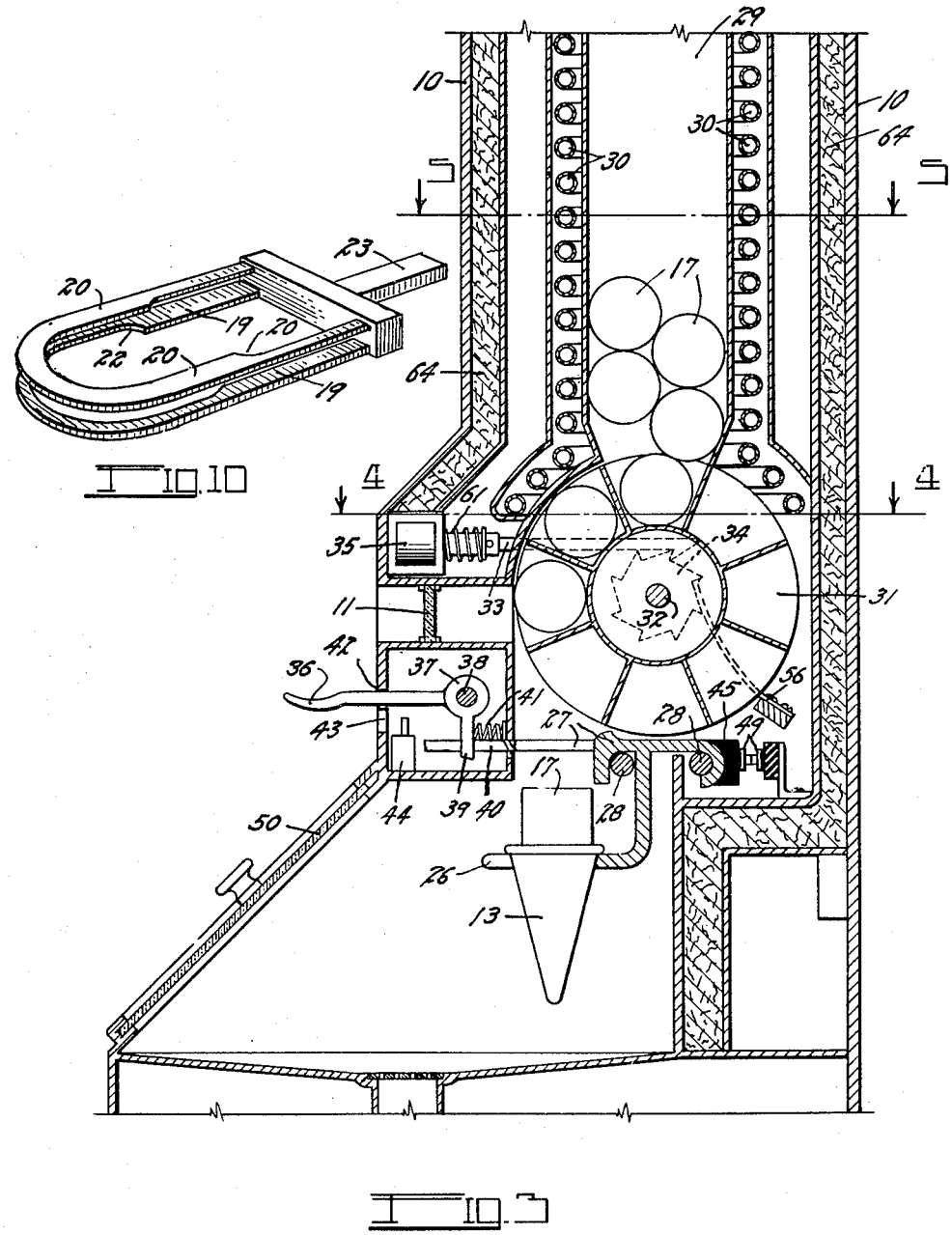
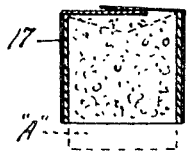
INVENTOR:
HOWARD S. MARTIN
BY
ATTORNEY Oct. 3, 1950     H. S. MARTIN     2,524,673
ICE CREAM CONE DISPENSER
Filed April 11, 1949     4 Sheets-Sheet 3
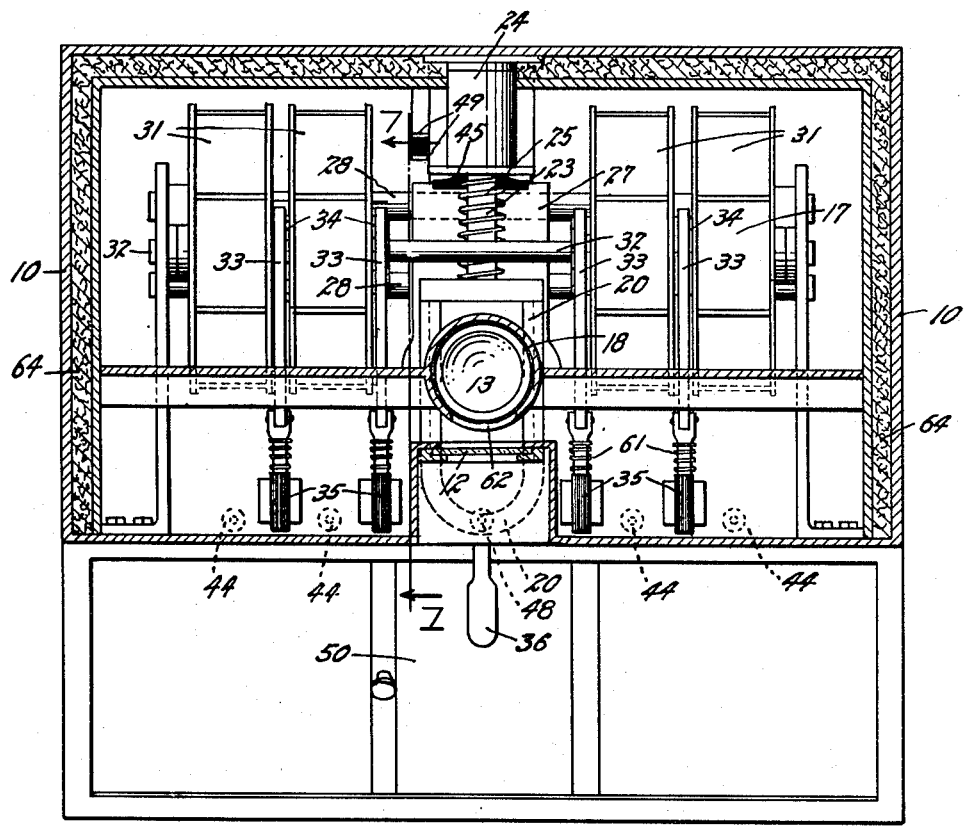
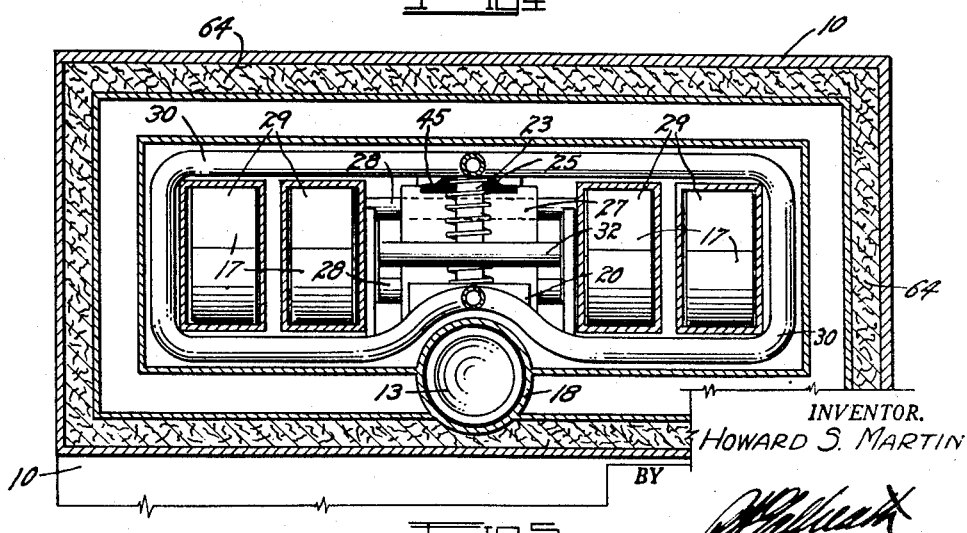
INVENTOR.
HOWARD S. MARTIN
BY
ATTORNEY Oct. 3, 1950          H. S. MARTIN          2,524,673
ICE CREAM CONE DISPENSER
Filed April 11, 1949          4 Sheets-Sheet 4
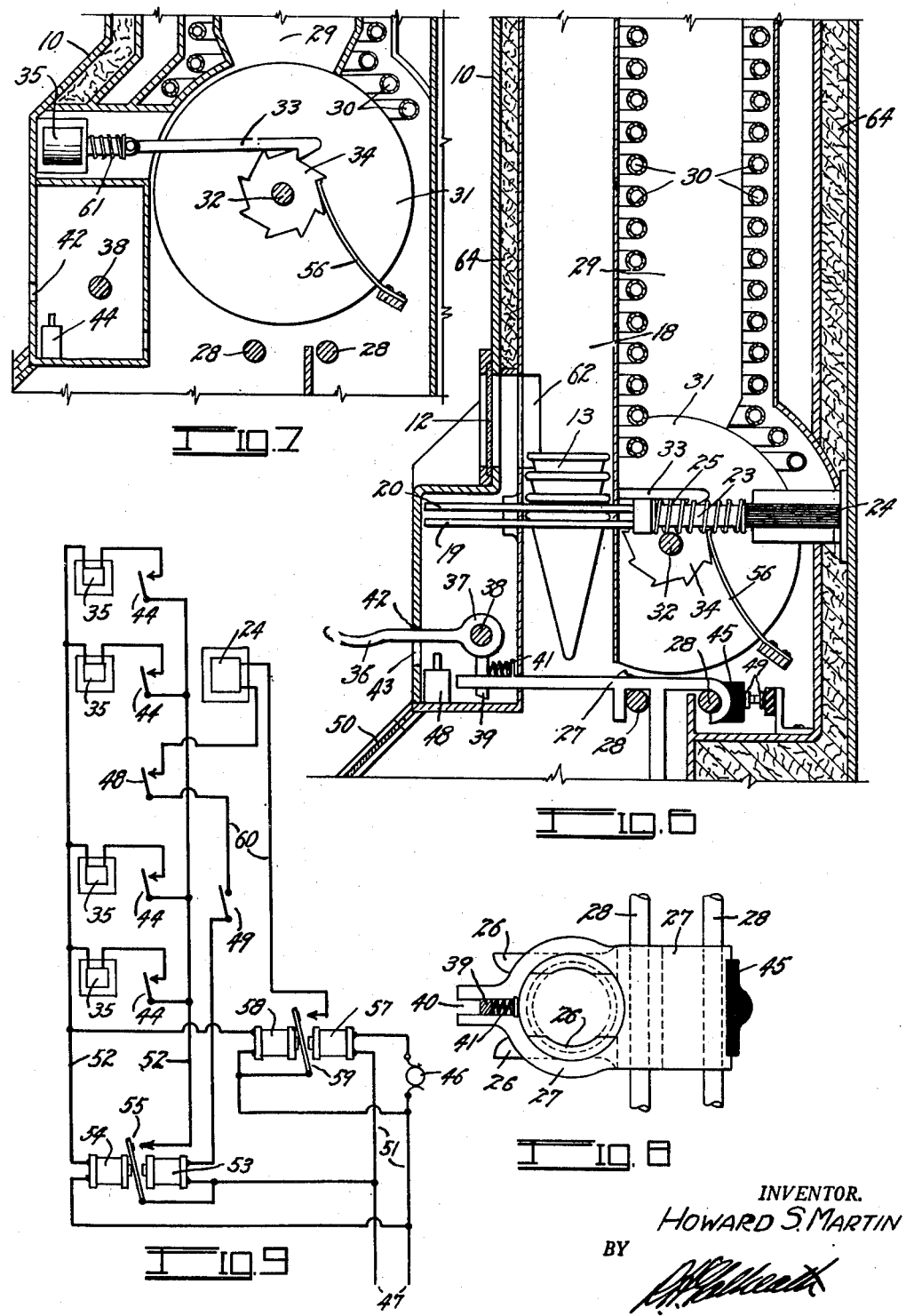
INVENTOR.
HOWARD S. MARTIN
BY
ATTORNEY Patented Oct. 3, 1950

2,524,673

UNITED STATES PATENT OFFICE 2,524,673

ICE-CREAM CONE DISPENSER

Howard S. Martin, Detroit, Mich., assignor of one-half to Nora B. Martin, Detroit, Mich.

Application April 11, 1949, Serial No. 86,708

5 Claims. (Cl. 226—2)

This invention relates to a machine for vending ice cream cones, and has for its principal object the provision of a simple and highly efficient device which will be coin-actuated to deliver a filled ice cream cone of any selected flavor.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 3 is an enlarged, detail, vertical section, taken on the line 3—3, Fig. 1;

Fig. 4 is a similarly enlarged, detail, horizontal section, taken on the line 4—4, Fig. 3;

Fig. 5 is a similar section, taken on the line 5—5, Fig. 3;

Fig. 6 is a vertical, detail section, taken on the line 6—6, Fig. 1;

Fig. 7 is a fragmentary, detail section, taken on the line 7—7, Fig. 4;

Fig. 8 is a detail, plan view of a cone-supporting carriage employed in the machine;

Fig. 9 is an electric circuit diagram of the improved machine;

Fig. 10 is a detail, perspective view of a cone delivery plate used in the improved machine; and Fig. 11 is a detail, sectional view of an ice cream package as delivered by the machine.

Figures 1, 2:
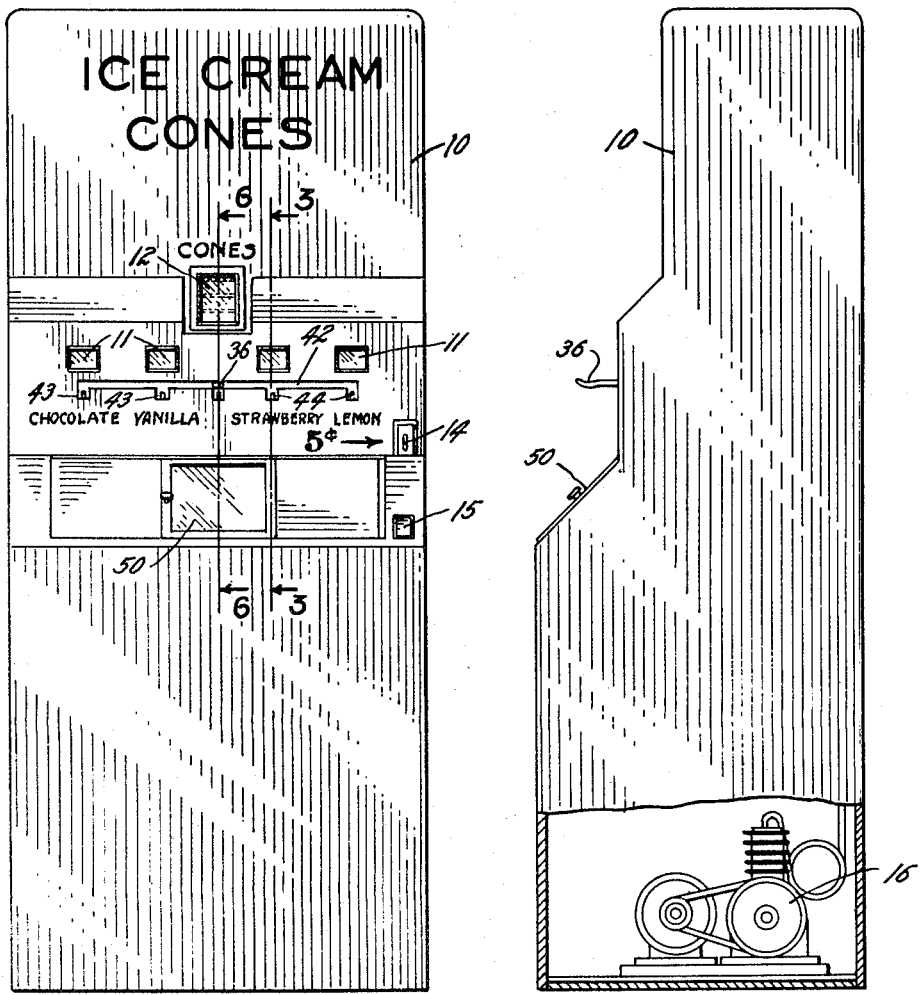
Fig. 1 is a front view of the improved ice cream cone vending machine.
Fig. 2 is a side view thereof, partially broken away to show the position of a refrigerating unit employed therein.

The improved ice cream cone vending machine is encased in any suitable outer housing 10 provided with windows 11 through which packages 17 of ice cream are visible. Each window carries the name of the particular flavor of ice cream visible through the window, such as "strawberry," "lemon," "chocolate," and "vanilla," as illustrated in Fig. 1. A central window 12 is also provided, through which ice cream cones 13 are visible.

The housing 10 is provided with a suitable coin slot 14 and a coin return chute 15. The coin-control mechanism may be any of the standard devices purchasable upon the open market, and designed to close a coin switch 46 (see Fig. 9) upon the insertion of a coin. The coin mechanism is not illustrated in detail in this application, as it, per se, forms no part of the invention.

The housing 10 is heat insulated, as indicated at 64, and is provided with a suitable refrigerating mechanism, designated in its entirety by the numeral 16, for circulating a cooling medium through cooling coils 30.

This application is more particularly directed to the mechanism for dispensing the cones 13 and selectively placing the packages 17 of ice cream therein.

The ice cream cones 13 are nested together in a vertical cone tube 18 positioned centrally within the housing 10. The lowermost cone of the pile of nested cones is supported between the sides of a lower reciprocating supporting plate 19, shown in detail in Fig. 10. The plate 19 is positioned below and parallel to an upper stop plate 20. The stop plate 20 is provided with an elongated opening 21, and the supporting plate is provided with a similar but oppositely positioned opening 22. The openings 21 and 22 have an enlarged extremity joined to a narrowed extremity. The enlarged extremity of the opening 21 is positioned normally in alignment with the pile of cones 13, while the enlarged extremity of the opening 22 is positioned to one side of the axis of the pile of cones. The two plates 19 and 20 join an armature member 23 which is attractable by a solenoid 24.

Thus, when the solenoid 24 is energized, it will attract the armature 23 to pull both plates 19 and 20 rearwardly toward the cone axis. This causes the enlarged extremity of the opening 22 to release the lowermost cone while the narrowed extremity of the opening 21 supports the next lowermost cone. When the solenoid 24 is de-energized, a spring 25 will return the armature so as to bring the wide opening in the plate 20 in alignment with the pile of cones to drop the lowermost cone to the narrow opening in the plate 19.

The released cone drops into a forked cone arm 26, which is mounted on and below a carriage 27. The carriage 2 is slidably mounted on a pair of horizontal track bars 28 so that it may be moved to any desired position along the bars. A sliding door 50 provides access to the carriage when it is positioned below the cone tube 18.

The ice cream may be in individual gobs or balls. It is preferred, however, to enclose each piece of ice cream in a tubular package 17, one end of which is covered with waxed paper or the like, the other end being open, as shown in Fig. 11. The user grasps the package and presses on the closed end, forcing the ice cream from the package 17, as indicated at "A," into the cone 13.

The packages 17 of ice cream are stored in vertical, rectangular ice cream tubes 29, each tube containing packages of a different flavor of ice cream. The tubes 29 are surrounded by refrigerated cooling coils 30 which prevent melting of the ice cream in the packages. The packages are individually dispensed from the tubes 29 by means of compartment wheels 31, all of which are rotatably mounted on a compartment wheel shaft 32 extending across the machine beneath the ice cream tubes 29.

Each of the compartment wheels is provided with an annular series of compartments, each of which is large enough to receive and be completely filled by one of the ice cream packages 17. The wheels are rotated one compartment-space interval by means of individual ratchet dogs 33, each of which engages one of the ratchet wheels 34, there being one ratchet wheel 34 secured to each of the compartment wheels 31. The dogs 33 are electrically actuated through the medium of solenoids 35.

Thus, it can be seen that at each actuation of a solenoid 35, one of the compartment wheels will be rotated to position an empty compartment below the pile of ice cream packages and to discharge a package from the lowermost compartment. By moving the carriage 27, the cone in the cone arm 26 can be positioned below the selected compartment wheel so as to receive the package dropping from the latter.

The carriage 27 is moved by means of a hand lever 36 which extends from a sleeve 37, which is slidably and rotatably mounted on a slide bar 38 extending horizontally across the machine parallel to the track bars 28. An arm 39 extends from the sleeve 37 into a slot 40 in the carriage 27. A spring 41 constantly urges the outer extremity of the lever 36 upwardly.

The lever 36 projects through a horizontal slot 42 in the housing 10, extending across and below the windows 11. The slot 42 is provided with a notch 43 below each of the ice cream windows 11 and below the cone window 12, into each of which the lever 36 may be depressed. A push switch 44 is mounted below each of the notches below the ice cream windows 11, and a similar push switch 48 is mounted below the cone window 12. The switches 44 and 48 are mounted below each of the notches 43 in the path of the lever 36 when the latter is depressed into the notches 43. A pair of circuit-closing switch blades 49 are mounted rearwardly of the middle point of the track bars 28 so as to be closed by contact with an insulated block 45, mounted on the carriage 27, when the latter is in position below the cone tube 18.

Referring to the circuit diagram of Fig. 9, it can be seen that the electrical connections of the machine are divided into three basic circuits, that is, a coin-controlled circuit 51, to which current supply mains 47 are connected; a cone-control circuit 60; and an ice cream supply circuit 52. The coin-controlled circuit 51 includes, in series, a coin-actuated switch 46 and a first relay-closing coil 57. The cone-control circuit 60 includes, in series, a first relay switch arm 59, the cone solenoid 24, the contact-closing switch blades 49, the push switch 48, and a second relay-closing coil 53. The ice cream supply circuit 52 includes the solenoids 35 and the push switches 44, in parallel arrangement, a first relay-opening coil 58, operating on an arm 59, and a second relay-opening coil 54, operating on a second relay switch arm 55. The coils 58 and 54 are arranged in parallel with each other and in series with the solenoids 35.

*Operation*

A proper coin is inserted in the coin slot 14 and acts to temporarily close the coin switch 46, actuating the first relay coil 57 to close the relay switch 59, which remains closed after the coin switch 46 opens. The operator now moves the handle 36 to the middle position below the cone window 12, unless, of course, it is already in this position. This causes the insulated block 45 to close the switch blades 49 and arranges the cone-control circuit 60 so that when the handle 36 is depressed to close the switch 48, the circuit 60 will be completed. Closing of the cone-control circuit 60 accomplishes two things: it energizes the cone solenoid 24 to cause a cone to fall into the forked cone arm 26 of the carriage, and it energizes the second relay-closing coil 53 to close a relay switch arm 55 to arrange the ice cream supply circuit 52 for operation.

The operator now slides the carriage, by means of the hand lever 36, to a position below the selected flavor of ice cream. He now depresses the handle to actuate the push switch 44 of the selected flavor and close the ice cream supply circuit 52. The closing of the latter circuit accomplishes three things: it energizes the selected one of the solenoids 35 to cause it to rotate its compartment wheel to drop an ice cream package into the cone; it also energizes the second relay-opening coil 54 to cause it to break the solenoid circuit at the relay switch arm 55; and it energizes the first relay-opening coil 58 to cause it to break the cone circuit 60 at the switch arm 59.

The filled cone is now moved to the central delivery position by means of the hand lever 36, and the cone is removed by hand through the door 50.

Thus, it can be seen that the machine will not operate to deliver ice cream until it has first delivered a cone; that it cannot deliver a cone until the carriage is in a position to receive it; and that after a package of ice cream has been delivered, no further operation is possible until a new coin has been inserted.

While a specific form of improvement has been described and illustrated herein, it is to be understood that the same may be varied, within the scope of the appended claims, without departing from the spirit of the invention.

Having thus described the invention, what is claimed and desired secured by Letters Patent is:

1. An ice cream cone vending machine comprising: a plurality of vertical ice cream tubes, each adapted to contain a plurality of units of ice cream, there being units of a different flavor of ice cream in each tube; a cone tube adapted to contain a pile of nested ice cream cones; dispensing mechanism below each tube adapted to dispense one ice cream unit and/or one cone at a time; a carriage movable beneath said tubes; means on said carriage for receiving and supporting a cone; a compartment wheel mounted below each ice cream tube; a solenoid arranged to rotate each compartment wheel one compartment space at each actuation; a switch in circuit with each solenoid; a lever for moving said carriage beneath the selected ice cream tube; and means operable by said lever for closing the switch opposite the selected ice cream tube to cause said solenoid to actuate its compartment wheel to deliver an ice cream unit to said cone.

2. An ice cream cone vending machine comprising: a plurality of vertically positioned, refrigerated ice cream tubes, each adapted to contain individual ice cream packages; an ice cream dispensing device below each tube arranged at each actuation to dispense one package; a vertical cone tube; a cone-dispensing device below said cone tube adapted at each actuation to dispense an ice cream cone; track members extending horizontally below said dispensing devices; a carriage mounted on said track members and adapted to travel therealong; means on said carriage for receiving a cone from said cone tube and supporting the latter below any desired one of said ice cream tubes; and means for successively operating said cone-dispensing device and said ice cream dispensing device.

3. An ice cream cone vending machine comprising: a plurality of vertically positioned, refrigerated ice cream tubes, each adapted to contain individual ice cream packages; an ice cream dispensing device below each tube arranged at each actuation to dispense one package; a vertical cone tube; a cone-dispensing device below said cone tube adapted at each actuation to dispense an ice cream cone; track members extending horizontally below said dispensing devices; a carriage mounted on said track members and adapted to travel therealong; means on said carriage for receiving a cone from said cone tube and supporting the latter below any desired one of said ice cream tubes; means for successively operating said cone-dispensing device and said ice cream dispensing device; a manually actuated, vertically and horizontally movable handle projecting forwardly from said carriage for moving the latter along its tracks; and means actuated by the downward movement of said handle to actuate the dispensing device below which said carriage is at that time positioned.

4. An ice cream cone vending machine comprising: a plurality of vertically positioned, refrigerated ice cream tubes, each adapted to contain individual ice cream packages; an ice cream dispensing device below each tube arranged at each actuation to dispense one package; a vertical cone tube; a cone-dispensing device below said cone tube adapted at each actuation to dispense an ice cream cone; track members extending horizontally below said dispensing devices; a carriage mounted on said track members and adapted to travel therealong; means on said carriage for receiving a cone from said cone tube and supporting the latter below any desired one of said ice cream tubes; and interlocking means for preventing actuation of the ice cream dispensing device until the cone-dispensing device has been actuated, and for preventing actuation of the cone-dispensing device until the carriage is in position below the cone tube.

5. An ice cream cone vending machine comprising: a plurality of vertically positioned, refrigerated ice cream tubes, each adapted to contain indivdual ice cream packages; an ice cream dispensing device below each tube arranged at each actuation to dispense one package; a vertical cone tube; a cone-dispensing device below said cone tube adapted at each actuation to dispense an ice cream cone; track members extending horizontally below said dispensing devices; a carriage mounted on said track members and adapted to travel therealong; means on said carriage for receiving a cone from said cone tube and supporting the latter below any desired one of said ice cream tubes; means for successively operating said cone-dispensing device and said ice cream dispensing device; a manually actuated, vertically and horizontally movable handle projecting forwardly from said carriage for moving the latter along its tracks; a solenoid arranged to actuate each ice cream dispensing device; a solenoid arranged to actuate the cone-dispensing device; and a circuit-closing switch positioned adjacent each vertical tube to be closed by the depression of said handle, said switches being in circuit with the solenoids of the respective tubes to actuate the latter when the handle is depressed in position before the selected tube.

HOWARD S. MARTIN.

REFERENCES CITED

The following references are of record in the file of this patent:

UNITED STATES PATENTS

| Number | Name | Date |
| --- | --- | --- |
| 1,667,930 | Edmunds | May 1, 1928 |
| 1,715,968 | Weber | June 4, 1929 |
| 1,942,440 | Mihalek | Jan. 9, 1934 |
| 2,445,713 | Glassner | July 20, 1948 |